United States Patent
Kishore et al.

(10) Patent No.: US 7,165,086 B2
(45) Date of Patent: Jan. 16, 2007

(54) SYSTEM, METHOD, AND APPARATUS FOR DIVISION COUPLED WITH ROUNDING OF SIGNED BINARY NUMBERS

(75) Inventors: Chhavi Kishore, Bangalore (IN); Aniruddha Sane, Bangalore (IN)

(73) Assignee: Broadcom Corporation, irvine, CA (US)

( * ) Notice: Subject to any disclaimer, the term of this patent is extended or adjusted under 35 U.S.C. 154(b) by 693 days.

(21) Appl. No.: 10/414,842

(22) Filed: Apr. 15, 2003

(65) Prior Publication Data
US 2004/0098442 A1    May 20, 2004

Related U.S. Application Data

(60) Provisional application No. 60/426,618, filed on Nov. 15, 2002.

(51) Int. Cl.
   *G06F 7/535*    (2006.01)
(52) U.S. Cl. .................... 708/653; 708/551
(58) Field of Classification Search ........... 708/653, 708/551, 497
   See application file for complete search history.

(56) References Cited

U.S. PATENT DOCUMENTS

| | | | | |
|---|---|---|---|---|
| 5,107,453 A | * | 4/1992 | Nomura | 708/653 |
| 5,365,471 A | * | 11/1994 | Sato | 708/493 |
| 5,696,713 A | * | 12/1997 | Kovacs | 708/653 |
| 5,754,460 A | * | 5/1998 | Tam | 708/653 |

* cited by examiner

*Primary Examiner*—D. H. Malzahn
(74) *Attorney, Agent, or Firm*—McAndrews, Held & Malloy Ltd.

(57) ABSTRACT

A system, method, and apparatus for efficient rounding of signed numbers is presented herein. If the divisor is positive, the dividend is added to one half of the magnitude of the divisor. If the divisor is negative, the complement of the dividend is added to one half of the magnitude of the divisor. If the dividend is negative, and the divisor is also negative, one is added to the sum of the inverted dividend and one-half of the magnitude of the divisor. If the dividend is negative and the divisor is positive, one is subtracted from the sum of the dividend and one-half the magnitude of the divisor. The result is then right shifted x times. If the signs of the divisor and dividend are different, a most-significant-bit(sign-bit) of the result is shifted in as the most significant bit during each right shift. Otherwise, a "0" is shifted in.

8 Claims, 3 Drawing Sheets

SYSTEM, METHOD, AND APPARATUS FOR DIVISION COUPLED WITH ROUNDING OF SIGNED BINARY NUMBERS

RELATED APPLICATIONS

The present application claims the priority benefit of U.S. Provisional Patent Application Ser. No. 60/426,618, entitled "Algorithm for Division Coupled with Rounding of Signed Binary Numbers", by Kishore et., al., filed Nov. 15, 2002, which is incorporated herein by reference for all purposes. The present application is also related to U.S. patent application Ser. No. 10/414,580, entitled "System, Method, and Apparatus for Division Coupled with Truncation of Signed Binary Numbers", by Kishore, et. al., filed Apr. 15, 2003, which is incorporated herein by reference for all purposes.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Various applications require rounding of signed numbers divided by an integer power of two, e.g., 1, 2, 4, 8, 16, etc. Rounding implies integer division with rounding to the nearest integer. Half integer values are rounded away from 0. For example, $3/2$ is rounded to 2, while $-3/2$ is rounded to $-2$.

Rounding of unsigned numbers can be achieved by addition along with the right shift operation. The value that is required to be added to a numerator and the number of times right shift has to be performed is equal to the $\log_2$ of the denominator. For example, if 14 (01110) is to be rounded by four, $\log_2 4=2$ (10) is added, resulting in 16 (10000). The result is then right shifted twice, resulting in 100, or four.

Although the foregoing scheme works for unsigned binary numbers, it does not yield correct results for signed binary numbers. This is because of the fact that in two's complement representation of signed binary numbers, the sign bit (most significant bit) of the numbers carries a negative weight. Thus if 10010 ($-14$) has to be rounded by 100 (4), the result should be $-4$. However, the foregoing scheme results in 101 ($-3$).

One way to achieve rounding of signed binary numbers is to convert the signed number to unsigned numbers (preserving the sign information), round the unsigned numbers, and apply to sign information. The foregoing adds additional steps of converting each signed number to unsigned number, requiring more processing, and more time.

Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

A method for efficient division by a signed divisor with a magnitude that is an integer power of two ($2^x$, or $-2^x$, where x is an integer) coupled with rounding of a signed dividend is presented herein. If the divisor is positive, the dividend is added to one half of the magnitude of the divisor. If the divisor is negative, the inverse, or compliment, of the dividend is added to one half of the magnitude of the divisor. If the dividend is negative, and the divisor is also negative, one is added to the sum of the inverted dividend and one-half of the magnitude of the divisor. If the dividend is negative and the divisor is positive, one is subtracted from the sum of the dividend and one-half the magnitude of the divisor. The result is then right shifted x times. If the signs of the divisor and the dividend are same, a zero is shifted into the most significant bit during each right shift. If the signs of the divisor and the dividend are different, the most significant bit of the result is shifted in as the most significant bit during each right shift.

A circuit for dividing a dividend by a divisor, wherein the magnitude of the divisor is an integer power of two, is also presented herein. The circuit comprises a switch for selecting either the dividend or the compliment of the dividend. The selection is based on the sign bit of the divisor, wherein the switch selects the dividend of the sign bit of the divisor indicates that the divisor is positive, and the compliment of the dividend if the sign bit of the divisor indicates that the divisor is negative. The circuit comprises another switch that selects either one half of the magnitude of the divisor, or one half of the divisor minus one, based on the sign bit of the selection of the other switch. An adder receives and adds the selections from both switches as well as the sign bit of the divisor. A shift register right shifts the result from the adder x times and shifts in either a one or a zero into the most significant bit each time. Whether a one or zero is shifted into the shift register is determined by a unit comprising of an exclusive or gate and an and gate. The exclusive or gate compares the sign bit of the divisor and the dividend. The output of the exclusive or gate anded with the most-significant-bit(sign bit) of the result of the adder is shifted into the shift register during each right shift.

An encoder for encoding data is presented herein. The encoder includes a discrete cosine transfer engine, a quantizer, a zig-zag scanner, and a Huffman decoder. The quantizer either implements the method presented herein or incorporates the circuit presented herein.

These and other advantages and novel features of the embodiments in the present application will be more fully understood from the following description and in connection with the drawings.

DESCRIPTION OF THE INVENTION

Figure 1:
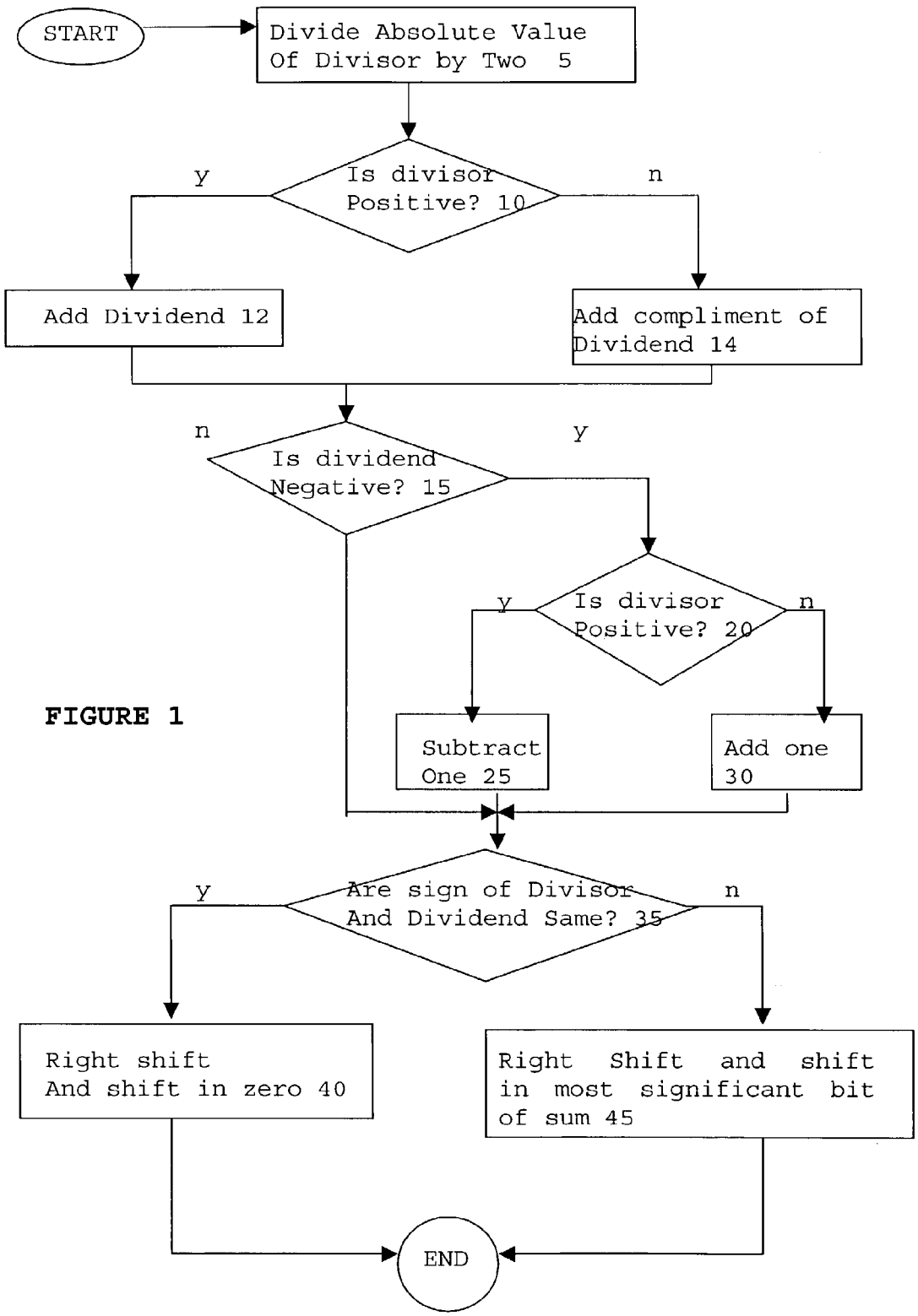
FIG. 1 is a flow diagram for rounding signed numbers in accordance with an embodiment of the present invention.

Referring now to FIG. 1, there is illustrated a flow diagram for rounding a signed integer dividend by a signed integer divisor which is either $2^x$, or $-2^x$, where x is a positive integer. At 5, the absolute value of the divisor divided by two is determined. The absolute value of the divisor divided by two can be determined, by for example, taking the rightmost x+1 bits, and right-shifting the rightmost x+1 bits one time.

At 10, a determination is made whether the divisor is positive. If the divisor is positive, the dividend is added (12) to the result of 5. If the divisor is negative, the compliment of the dividend is added (14) to the result of 5. The compliment of the dividend is taken by inverting each bit position in the dividend.

At 15, a determination is made whether the dividend is negative. If at 15, the dividend is negative, a determination is made whether the divisor is positive at 20. If the dividend is negative at 15, and the divisor is positive at 20, one is subtracted (25) from the result at 10. If the dividend is negative at 15, and the divisor is negative at 20, one is added (30) to the result at 10. If the dividend is positive at 15, 20–30 are bypassed.

At 35, a determination is made whether the signs of the divisor and dividend are the same. If the signs are the same, the result from 15, 25, or 30 is right-shifted (40) x times. If the signs are different, the result from 15, 25, or 30 is right-shifted x times, and during each shift, a most-significant-bit(sign bit) of the result of 15, 25, or 30 is shifted in (45). The result is the signed integer dividend rounded by the signed divisor.

Figure 2:
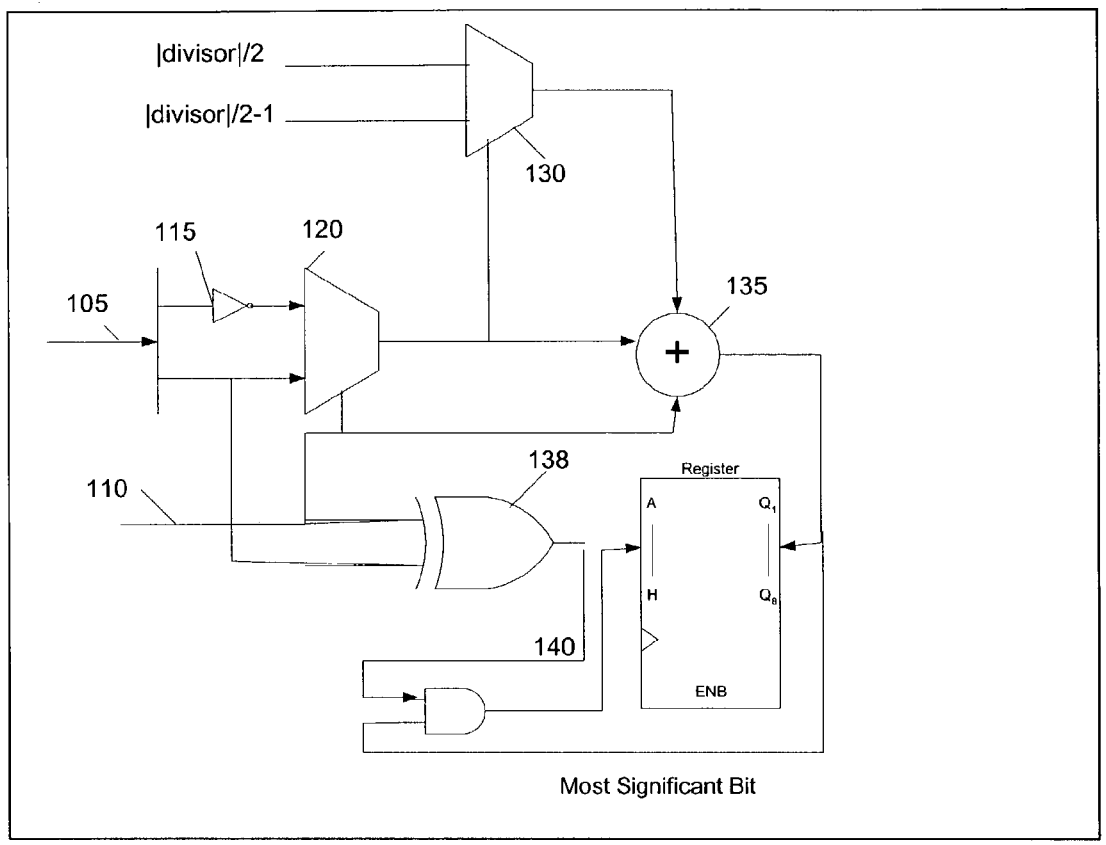
FIG. 2 is a circuit for rounding signed numbers in accordance with an embodiment of the present invention.

Referring now to FIG. 2, there is illustrated a block diagram of an exemplary circuit for rounding a signed integer dividend by a signed integer divisor that is either $2^x$, or $-2^x$, where x is a positive integer. The circuit includes an input for the dividend 105 and the divisor 110. The input for the dividend 105 includes an inverter 115 for inverting the dividend. The dividend and the inverted dividend are received at a switch 120. The switch 120 selects either the dividend or the inverted dividend and is controlled by the sign bit of the divisor. If the sign bit of the divisor is a "0", the switch selects the dividend. If the sign bit of the divisor is a "1", the switch selects the inverted dividend.

A second switch 130 selects either one-half of the magnitude of the divisor or one-half of the divisor minus one, based on the sign of the output of the switch 120. One-half of the magnitude of the divisor can be achieved by right-shifting the divisor one time, and discarding each bit to the left of the least significant "1". For example, to take one-half the magnitude of –4, represented by 11111100, right-shifting one time results in 111110. Discarding each bit to the left of the least significant bit results in 10, representing 2. One-half of the magnitude of the divisor minus one is taken by inverting one-half of the divisor minus one. In the previous example, 10, representing 2, is inverted to provide 01, representing 1. If the sign of the output of the switch 120 is a "1", the output of switch 130 is one half of the magnitude of the divisor minus one. If the sign of the output of the switch is a "0", the output of the switch 130 is one half of the magnitude of the divisor. An adder 135 receives and adds the output of the switch 130, switch 120, and the sign bit of the divisor.

The circuit also includes an XOR gate 138. The XOR gate 138 receives the sign bits of both the divisor and the dividend. Where the bits match (both 0, or both 1), the output of the XOR gate 138 is a 0. Where the bits are different, the output of the XOR gate 138 is a 1. The output of the XOR gate 138 goes as input to a two input AND gate, the other input of which is the most-significant-bit(sign bit) of the result of adder 135.

A shift register 140 receives the output of the adder 135 and the AND gate as inputs. The shift register 140 loads the output of the adder 135 and right shifts x times. During each shift, the least significant bit of the shift register 140 is shifted out. Additionally, during each shift, the output of the AND gate is shifted in as the most significant bit. After the foregoing, the contents of the shift register 140 are the dividend rounded by the divisor.

Rounding a signed number by a power of two is used in a variety of applications, including digital compression. During MPEG compression, data is quantized. The quantization of the data includes rounding the data by a power of two.

Figure 3:
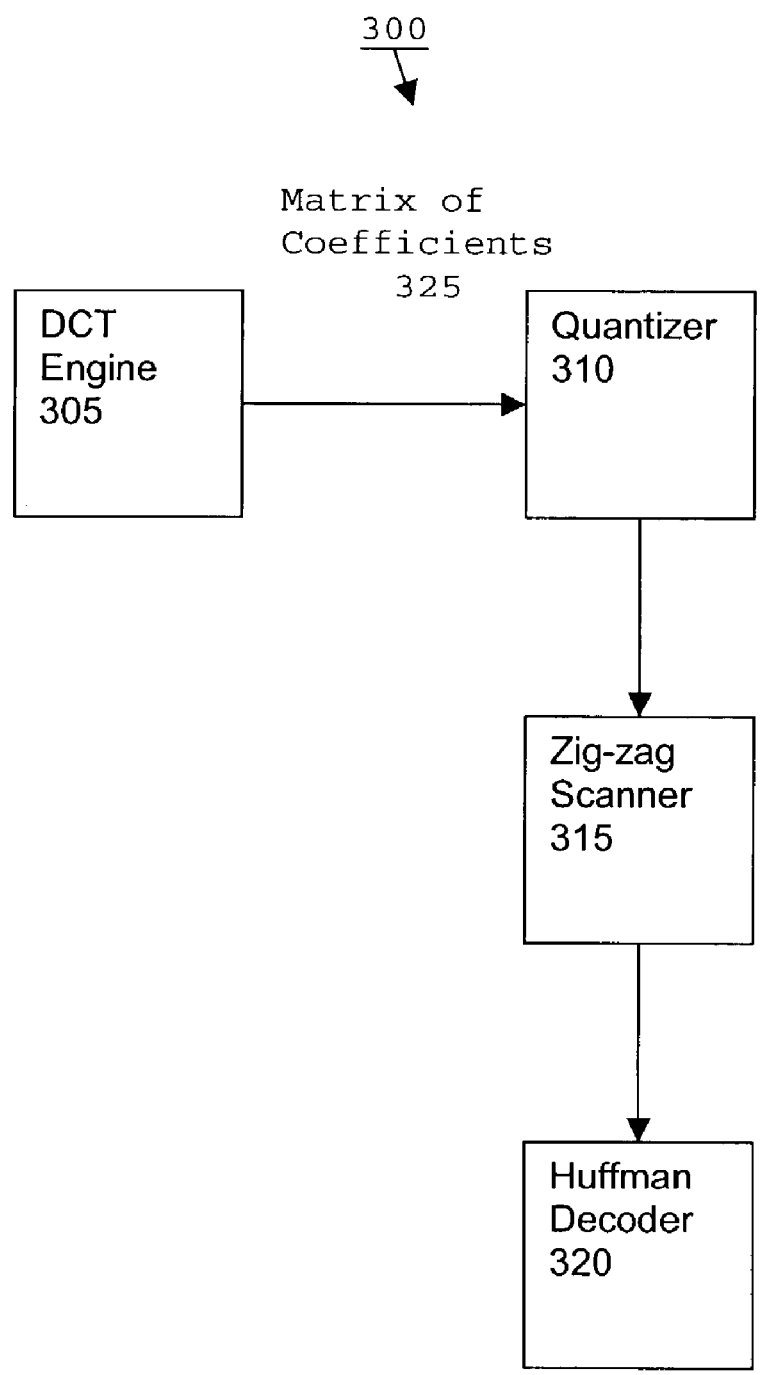
FIG. 3 is a decoder configured in accordance with an embodiment of the present invention.

Referring now to FIG. 3, there is illustrated an exemplary MPEG video encoder 300 wherein the present invention can be practiced. The encoder comprises a DCT engine 305, a quantizer 310, a zig-zag scanner 315, and a Huffman Decoder 320. The DCT engine 305 receives image data and converts the image data from the spatial domain to the frequency domain.

The image data in the frequency domain is represented by a matrix of coefficients 325, each of which correspond to particular frequencies. The quantizer 310 receives the matrix of coefficients 325 and quantizes the matrix of coefficients 325. Because human vision is less discriminating to contribution of higher frequency coefficients, the higher frequency coefficients can be represented with less accuracy without significant noticeable distortion. Accordingly, the higher frequency coefficients are represented by fewer bits while the lower frequency coefficients are represented by more bits.

The quantizer 310 represents the coefficients by quantized value and a scale factor. The scale factor is 2x, or –2x, wherein x is an integer. For higher frequencies, x is higher, while for lower frequencies, x is lower. To determine the quantized value, the coefficients 325 are rounded by the scale factor. The quantizer 310 can be incorporated the circuit described in FIG. 2, or implement the flow diagram of FIG. 1 to round the coefficients 325 by the scale factor.

The output of the quantizer 310 is provided to the zig-zag scanner 315. The zig-zag scanner 315 scans the quantized coefficients diagonally starting from the top left corner and ending at the bottom right corner. The output of the zig-zag scanner 315 is provided to the Huffman encoder 320. The Huffman encoder 320 encodes the scanned quantized coefficients using a variable length code.

One embodiment of the present invention may be implemented as a board level product, as a single chip, application specific integrated circuit (ASIC), or with varying levels integrated on a single chip with other portions of the system as separate components. The degree of integration of the monitoring system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A circuit for dividing a dividend by a divisor, wherein the magnitude of the divisor is an integer power of two, said circuit comprising:
   a first switch for selecting the dividend or the compliment of the dividend;
   a second switch for selecting one half of the magnitude of the divisor or one half of the magnitude of the divisor minus one;
   an adder for adding the selection of the first switch and the selection of the second switch and outputting a sum; and
   a shift register for right shifting the sum from the adder the integer power of two times.

2. The circuit of claim 1, wherein the first switch selects the dividend if the sign bit of the divisor is zero and selects the compliment of the dividend if the sign bit of the divisor is one.

3. The circuit of claim 1, further comprising:
   an exclusive OR gate for comparing the sign of the divisor and the sign of the dividend; and
   an AND gate for providing the product of an output of the exclusive-OR gate and a most significant bit of the sum.

4. A circuit for dividing a dividend by a divisor, wherein the magnitude of the divisor is an integer power of two, said circuit comprising:
   a first switch for receiving the dividend and the compliment of the dividend;
   a second switch for receiving one half of the magnitude of the divisor and one half of the magnitude of the divisor minus one;
   an adder connected to the first switch and the second switch; and
   a shift register connected to the adder.

5. The circuit of claim 4, wherein the first switch receives the sign bit of the divisor and selects the dividend if the sign bit of the divisor is zero and selects the compliment of the dividend if the sign bit of the divisor is one.

6. The circuit of claim 4, further comprising an exclusive OR gate connected to the shift register.

7. An encoder for encoding data, said encoder comprising:
   a discrete cosine transformation engine for transforming the data to the frequency domain;
   a quantizer for quantizing the data in the frequency domain; and
   memory for storing a plurality of instructions for dividing a dividend by a divisor, wherein the magnitude of the divisor is an integer power of two, the plurality of instructions further comprising:
   adding the dividend to one half of the magnitude of the divisor, wherein the divisor is positive;
   adding a compliment of the dividend to one half of the magnitude of the divisor, wherein the divisor is negative, thereby resulting in a sum; and
   right-shifting the sum the integer number of times.

8. An encoder for encoding data, said encoder comprising:
   a discrete cosine transformation engine for transforming the data to the frequency domain;
   a quantizer for quantizing the data in the frequency domain, the quantizer further comprising a circuit for dividing a dividend by a divisor, wherein the magnitude of the divisor is an integer power of two, the circuit comprising:
   a first switch for selecting the dividend or the compliment of the dividend;
   a second switch for selecting one half of the magnitude of the divisor or one half of the magnitude of the divisor minus one;
   an adder for adding the selection of the first switch and the selection of the second switch and outputting the sum; and
   a shift register for right shifting the sum from the adder the integer power of two times.

* * * * *